Feb. 18, 1958 L. I. VOLCKENING ET AL 2,823,798

COVERED PACKAGE WITH INITIALLY SEALED BUT RELEASABLE TUCK CLOSURE FLAP

Filed Oct. 29, 1956 3 Sheets-Sheet 1

INVENTORS:
Lloyd I. Volckening,
John R. O'Meara,
Frank J. Lefebvre,
BY Harry B. Cook, ATTORNEY Feb. 18, 1958 L. I. VOLCKENING ET AL 2,823,798

COVERED PACKAGE WITH INITIALLY SEALED BUT RELEASABLE TUCK CLOSURE FLAP

Filed Oct. 29, 1956 3 Sheets-Sheet 2

Inventors:
Lloyd I. Volckening,
John R. O'Meara,
Frank J. Lefebvre,
By Harry B. Rook, Attorney.

Feb. 18, 1958 — L. I. VOLCKENING ET AL — 2,823,798

COVERED PACKAGE WITH INITIALLY SEALED BUT RELEASABLE TUCK CLOSURE FLAP

Filed Oct. 29, 1956 — 3 Sheets-Sheet 3

Inventors:
Lloyd I. Volckening,
John R. O'Meara,
Frank J. Lefebvre,
By Harry B. Cook, Attorney United States Patent Office
2,823,798
Patented Feb. 18, 1958

2,823,798

COVERED PACKAGE WITH INITIALLY SEALED BUT RELEASABLE TUCK CLOSURE FLAP

Lloyd I. Volckening, Glen Ridge, John R. O'Meara, Scotch Plains, and Frank J. Lefebvre, Caldwell, N. J., assignors to Ivers-Lee Company, Newark, N. J., a corporation of Delaware Application October 29, 1956, Serial No. 619,075

3 Claims. (Cl. 206—65)

This application is a continuation-in-part of our application Serial No. 421,894 filed April 8, 1954, and now abandoned.

This invention relates to packages of the general type shown in Patent No. 2,457,924 dated January 4, 1949, for small articles such as tablets or for liquid, powder or paste, the package comprising in general an approximately flat, rectangular bag, envelope or like container, preferably formed of sheet material having a thermoplastic coating, and a cover formed of a single strip of material relatively stiffer than the material of which said container is formed, said cover having one end portion folded around one end of the container and sealed to the container in a zone adjacent the fold with a marginal end portion of the cover beyond the fold spaced from the container and with the body portion of the cover juxtaposed to one side of the container and folded around the other end of the container to form a closure flap that is of a size to cover the side of the container opposite the body portion of the cover and has its edge releasably tucked between said marginal end portion of the cover aand said container so that the closure flap is held against unfolding but can be pulled from beneath said marginal end portion and unfolded to open the package.

When such packages are handled roughly, or when the contents of the container are bulky so that the container is thick or bulges at its opposite sides, said cover flap may be accidentally pulled or displaced from between said marginal end portion of the cover and the container so as to expose the container and also hinder the free handling and packing of the package in cartons for shipment.

Therefore, a prime object of the present invention is to provide in a package of this general nature, novel and improved means for initially positively securing the cover flap in closed position without the use of extraneous or separate fastening means.

Another object of the invention is to provide such a package which shall be so constructed as to permit quick forceable release of the cover flap to open the package and thereafter permit the closure flap to be releasably tucked between said marginal end portion of the cover and the container for closing the package.

A further object is to provide such a package wherein the closure flap shall have a portion of the end edge zone thereof, for example a tab or tongue, initially sealed between the container and said marginal end portion of the cover which serves as a container attaching flap, by the thermoplastic coating on the wall of the container.

Still further objects are to include novel and improved means in a package of this character providing for manual separation of said portion of said end edge zone or tab from the closure flap to release the closure flap for swinging away from the container to afford access to the container; and thus to include means in the package providing for simultaneous manual tearing of the container, the cover strip and juxtaposed portions of said attaching flap and said body portion along a line extending inwardly from said fold and beyond said sealed zone and transversely of said portion of said end zone or tab to release the cover flap.

Other objects, advantages and results of the invention will be brought out by the following description in conjunction with the accompanying drawings in which.

Figures 1, 2, 3, 4, 5:
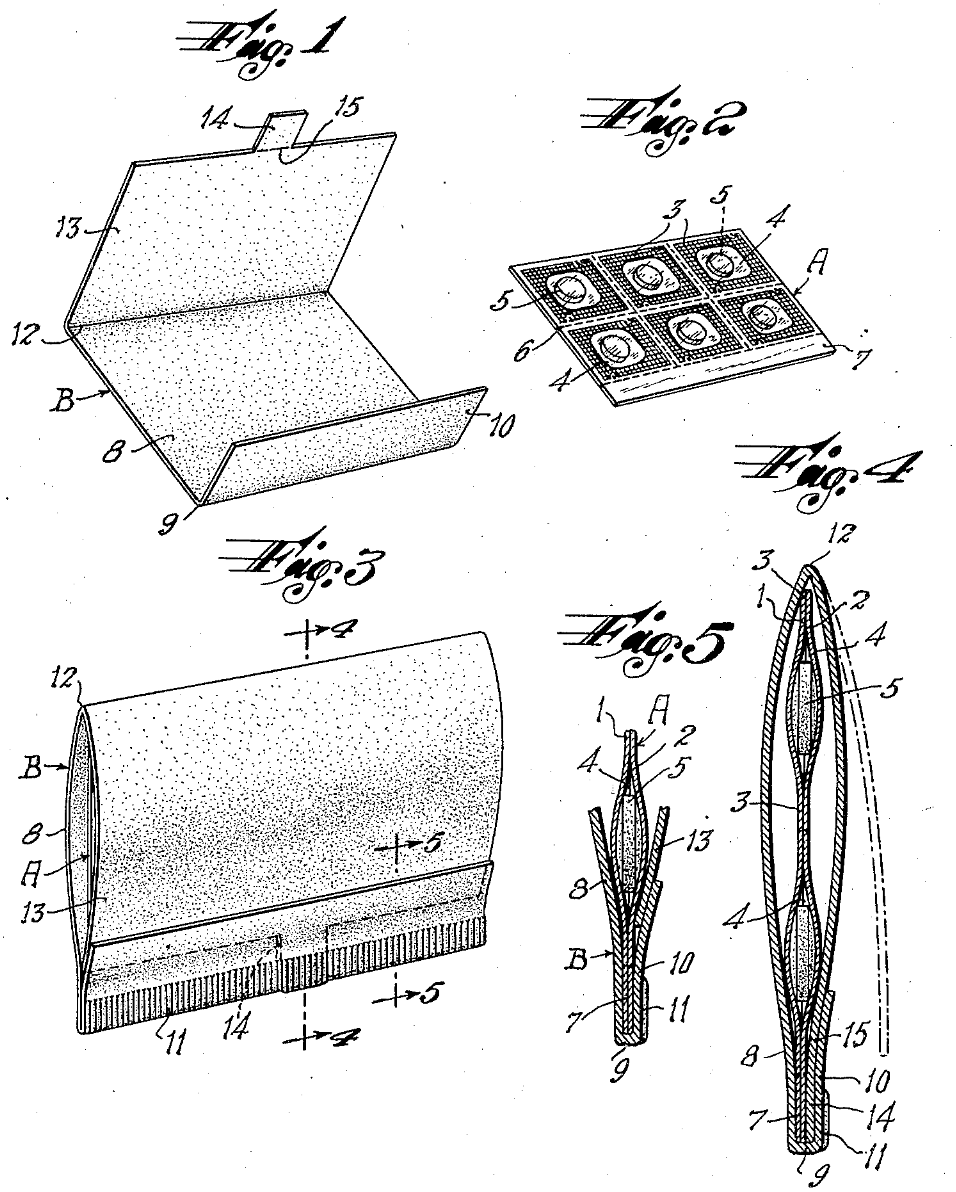
Figure 1 is a perspective view of the cover of the package in partially folded condition.
Figure 2 is a detached perspective view of one type of bag, envelope or container associated with the cover.
Figure 3 is a perspective view of a complete package with the closure flap in initially sealed condition.
Figure 4 is an enlarged transverse vertical sectional view on the plane of the line 4—4 of Figure 3 and showing the closure flap released and opened in dot and dash lines.
Figure 5 is a fragmentary enlarged vertical sectional view on the plane of the line 5—5 of Figure 3.

For the purpose of illustrating the principles of the invention, we have shown the container A as comprising two layers 1 and 2 of suitable flexible material, such as cellophane, Pliofilm, metallic foil, paper or the like. The said material may be thermo-plastic itself or may have a thermo-plastic or fusible coating so that the juxtaposed layers can be caused to adhere together by application of heat and pressure, or the layers could be sealed together with an adhesive. As shown, the layers are heat sealed and crimped in zones 3 forming and bounding compartments 4 between the layers in which a commodity such as tablets 5 are enclosed, the container thus comprising a sheet of packages, each containing a tablet and being separable from the sheet along scored lines 6; and the sheet preferably has an edge portion 7 extending beyond the package and being initially unsealed.

The cover B comprises a single strip of sheet material such as heavy paper that is relatively stiffer than the layers of which the container A is formed and includes a body portion 8 juxtaposed to one side of the container and folded at 9 around one edge portion 7 of the container to form a container-attaching flap 10 that is secured adjacent the fold to the container A for example, by application of heat and pressure where the layers 1 and 2 are thermoplastic or have thermoplastic coatings, the transverse marginal end portion of the flap being spaced from the container. Preferably the sealed zone is also crimped as indicated at 11. The body portion 8 of the cover is of approximately the same shape but somewhat larger than the container A in length and breadth and at the end of the body portion opposite the fold 9 there is another fold 12 in the strip around the edge or end of the container opposite the attaching edge 7, and beyond said fold 12 is a closure flap portion 13 that is of a size and shape to cover the side of the container opposite the body portion 8 of the cover; and the transverse end edge zone of said closure flap is adapted to tuck into the space between the transverse marginal end portion of the container-attaching flap 10 and the container, as best shown in Figure 3 and 5.

A tab 14 projects integrally beyond said end edge of the closure flap and is initially sealed between the container-attaching flap 10 and the portion 7 of the container A. This seal may be effected by the softening or fusing of the thermoplastic substance where the container is formed of material that is itself thermoplastic or has a thermoplastic coating, but the seal may also be made with any suitable adhesive. Preferably the zone of the closure flap at the juncture of the tab 14 with the main portion of the closure flap is weakened as by scoring or perforations 15 before the tab is sealed so that after the package has been completed with the closure flap sealed as described, the closure flap may be torn along the weakened zone 15 to detach it from the tab and thereby permit the edge portion of the closure flap to be pulled from between the container-attaching flap 10 and the container and then swung into open position to expose the container. Figure 4 shows the closure flap swung into partially open position in dot and dash lines, and by swinging the closure flap about the fold 12 as a hinge, the package can be completely opened to expose the container A for removal of the contents of the container. Thereafter, the closure flap can be tucked between the container-attaching flap and the container to close the package again, if desired.

A modification of the invention is shown in Figures 6 to 14 inclusive where the commodity container is designated C and is in general similar to the container A, the container also having an edge portion 16 extending beyond the package and being initially unsealed like the edge portion 7.

Figures 11, 12, 13, 14, 15, 16, 17:
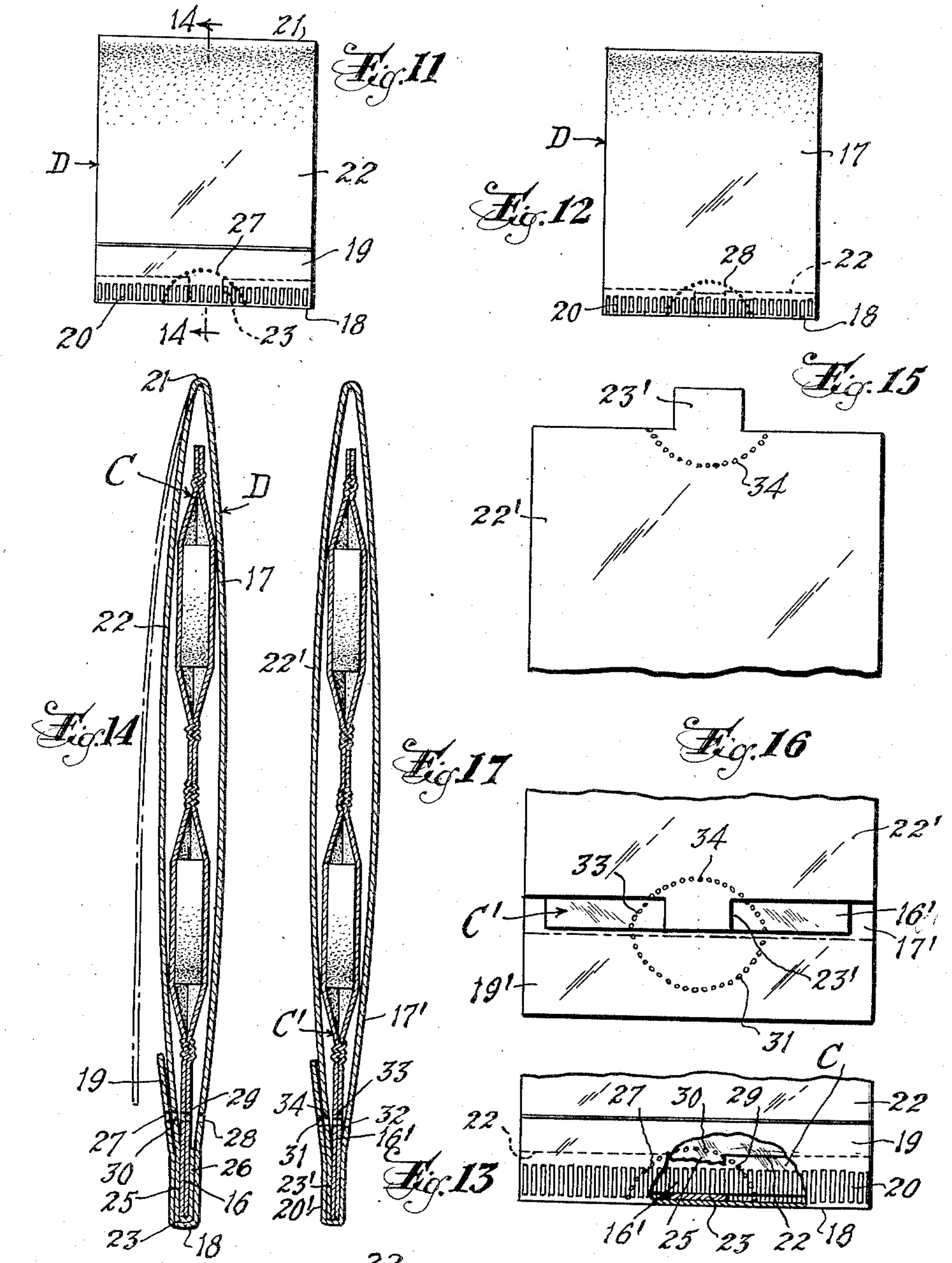
Figure 11 is a top plan view of the completed package illustrated on a reduced scale.
Figure 12 is a bottom plan view of the package as shown in Figure 11.
Figure 13 is an enlarged fragmentary top plan view of the package as shown in Figure 11 with portions of the container-attaching flap and portions of the tab on the edge of the closure flap broken away.
Figure 14 is a greatly enlarged transverse vertical sectional view approximately on the plane of the line 14—14 of Figure 11.
Figure 15 is a fragmentary plan view of the closure flap portion of the cover showing the modified form of the tab.
Figure 16 is a view similar to Figure 9 showing the container and the cover having the tab as shown in Figure 15 in partially assembled relation.
Figure 17 is a view like Figure 14 of a complete package showing the modification of the cover and tab illustrated in Figures 15 and 16.

The cover D comprises a single strip of sheet material such as heavy paper and includes a body portion 17 juxtaposed to one side of the container in the complete package shown in Figures 11 and 14 and folded at 18 around the edge portion 16 to form a container-attaching flap 19 that is secured adjacent and along the fold to the container C by application of heat and pressure, the transverse marginal end portion of the flap being spaced from the container. Preferably the sealed zone is also crimped as indicated at 20. The body portion 17 of the cover is approximately the same shape but somewhat larger than the container in length and breadth and at the end of the body portion opposite the fold 18 there is another fold 21 in the strip around the edge or end of the container opposite the attaching edge 16; and beyond said fold 21 is a closure flap portion 22 that is of a size and shape to overlie and cover the side of the container opposite the body portion 17 of the cover. The transverse end edge zone of said cover flap is adapted to tuck into the the space between the transverse marginal end portion of the container-attaching flap 19 and the container as best shown in Figures 11, 13, 14 and 18. In accordance with the invention, the end edge of the closure flap has a zone initially sealed and locked to hold the closure flap in closed position and more particularly said zone may comprise a tongue or tab projecting from the end edge of the closure flap and hooked around the edge of the commodity container C and sealed to the outer surfaces of both walls of the container.

Figures 6, 7, 8:
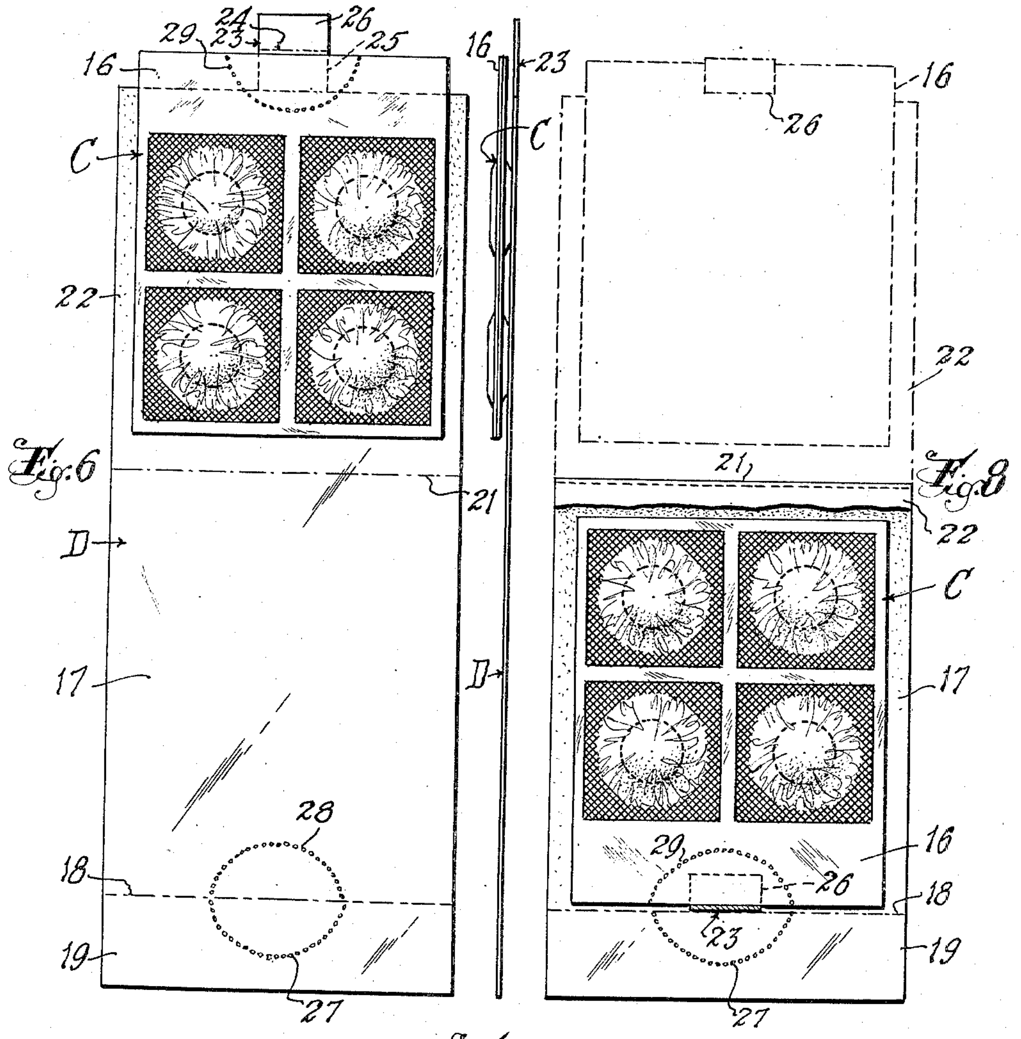
Figure 6 is a plan view of the commodity container and the cover of the package during the first step of assembly thereof, showing a modification.
Figure 7 is a side elevational view of the cover strip and commodity container as shown in Figure 6.
Figure 8 is a plan view showing another step in the assembly of the cover and the container, with portions of the closure flap of the cover broken away for clearness of illustration.
Figure 9:
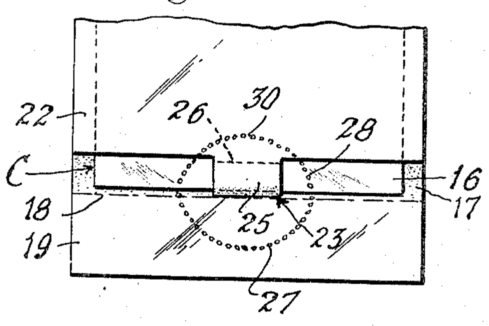
Figure 9 is a fragmentary view similar to Figure 8 showing the end of the closure flap of the cover that is broken away in Figure 8.
Figure 10:
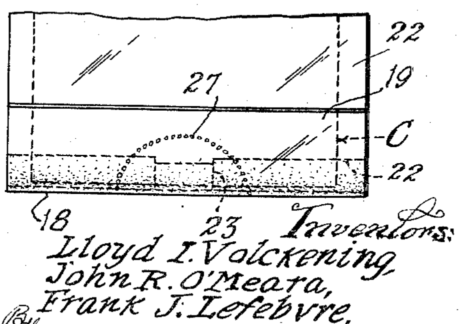
Figure 10 is a fragmentary view similar to Figure 9 showing the container-attaching flap folded over the edge of the cover flap and prior to the sealing of the container in the cover.

As shown, the end edge of the closure flap has an elongate tongue 23 projecting from the end edge thereof about centrally of the end edge, said tongue preferably being bent, for example, along a scored line 24 intermediate its length from the initial straight position shown in Figure 6 to the position shown by broken lines in Figure 8, so that the root portion 25 of the tongue may overlie one wall of the edge portion 16 while the tip portion 26 of the tongue may overlie the other wall of the container at said edge portion 16 as shown in Figures 8, 9 and 14, the tongue being hooked over the container edge.

In assembling the container A and the container C and cover D, the container is laid upon the closure flap portion 22 with the edge portion 16 overlying the portion of the tongue 23 between the fold 24 and the root of the tongue as shown in Figure 6 whereupon the closure flap and container are folded downwardly over the body portion 17 so as to bring the longitudinal edge portion of the container into the fold 18 in the container-attaching flap as shown in Figures 8 and 9. Thereupon, the container-attaching flap 19 is folded upwardly over one wall of the portion 16 of the container and the tip portion 26 of the tongue is folded against the opposite wall of the container. Then the container-attaching flap and body 17, the root portions and the tip portions of the tongue are permanently secured to the container, which may be effected by softening or fusing of the thermoplastic substance where the container is formed of material that is itself thermoplastic or has a thermoplastic coating. The tongue portions 25 and 26 may also be crimped in the same way and at the same time that the container-attaching flap and cover are sealed to the container in the zone 20.

Figure 18:
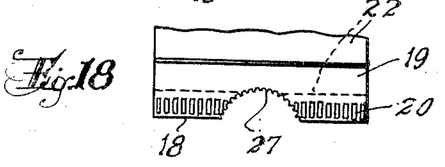
Figure 18 is a view similar to Figure 11 showing the portions of the container-attaching flap, the container, the tab and the body portion of the cover torn away to release the cover.

In accordance with the invention, means is provided for simultaneous manual tearing of the closure flap, the container and the juxtaposed portions of the container-attaching flap 19 and the body portion 17 of the cover along a line extending inwardly from the fold 18 and beyond the sealed zone 20 and transversely of the sealed portion or tab or tongue at the end edge zone of the closure flap. As shown, the container-attaching flap is weakened as by an arcuate line of perforations or scoring 27 inwardly from the fold 18 and short of the free edge of the container-attaching flap but beyond the sealed zone 20. The body portion 17 of the cover is similarly weakened as by an arcuate line of perforations or scoring 28 from the fold 18 inwardly of the body portion while the container has a similarly weakened area 29 extending inwardly of the end edge of the portion 16 of the container. The closure flap is similarly weakened along a curved line 30 inwardly and transversely of the sealed zone or tongue 23 as best shown in Figure 9. Preferably these weakened areas or lines are arranged in register or directly superposed relation to each other in the completed package, and when it is desired to open the package the portions of the package between the fold 18 and the scored lines 27 and 28 are gripped between the thumb and forefinger and torn from the package along the weakened lines as shown in Figure 18. This action results in the detachment of the sealed zone or tongue of the closure flap so that the end edge of the closure flap may be pulled from beneath the container-attaching flap as shown by broken lines in Figure 14 and then swung away from the container into open position to permit access to the container.

In Figures 15 to 17 inclusive, a package in general similar to that shown in Figures 1 to 14 inclusive is illustrated, the only difference between the two packages being that in the latter package the closure flap 22' has a short tongue or tab 23' that terminates at the end edge of the portion 16' of the container C' as best shown in Figures 16 and 17; and the tongue is thus sealed to only one side of the container between the container and the container-attaching flap along the sealed zone 20' as best shown in Figure 17.

The package shown in Figures 15 to 17 inclusive has similar weakened areas or scored lines 31, 32, 33 and 34 correspond respectively to the areas 27, 28, 29 and 30, for separating the tab or tongue from the closure flap.

It must be observed that the invention provides a positive initial sealing or locking of the closure flap in closed position, simultaneously with the sealing of the container in the cover strip, the tab or sealed portion of the closure flap extending into only a portion of the sealed zone so as to insure a firm sealing of the container to both the body portion and the container-attaching flap of the cover. Moreover, the invention provides for simple and quick release or detachment of the cover flap from the sealed zone without damage to the cover flap so that the cover flap can thereafter be simply tucked between the container-attaching flap and the container for closing the package.

To avoid circumlocution, the term "commodity container" is used in the appended claims to denote bags, envelopes or the like containing a plurality of articles such as tablets, or a powder, liquid or paste, as well as assemblages or groups of commodities held together in some other way, for example, strips of matches.

What we claim is:

1. A package comprising an approximately flat commodity container having outer thermoplastic surfaces, and a cover comprising a strip of flexible material having a fold providing a body portion with a container-attaching flap, one edge portion of said container being disposed in said fold in juxtaposition to said body portion and positively thermoplastically sealed directly to said body portion and to said container-attaching flap in a zone disposed inwardly of said fold with the edge of said container-attaching flap spaced from said container, said body portion having a closure flap hinged at the end of the body portion opposite said container-attaching flap and of a size and shape to overlie the side of said container opposite said body portion with its edge tucked between said container and the free edge of said container-attaching flap to close the package, and means initially positively securing said closure flap in package-closing position, said means including a portion of the end edge zone of the closure flap which extends approximately to said fold between said container and the container-attaching flap and is thermoplastically and permanently fastened directly to the outer surface of the adjacent side of the container when the closure flap is in closed position, said closure flap being otherwise free of said container said portion of the end edge zone of the closure flap comprising at least one tongue projecting integrally beyond said end edge of the closure flap and initially thermoplastically sealed in direct contact with the wall of said commodity container, and there being means providing for simultaneous manual tearing of said container, said closure flap and juxtaposed portions of said attaching flap and said body portion along a line extending inwardly from said fold and beyond said sealed zone and transversely of said tongue to separate the tongue from the cover flap and thereby release said cover flap for swinging away from said container into open position, said closure flap being of a size after said separation of the closure flap and said sealed zone to provide for releasable tucking of the end edge of the closure flap into the space between the container and said marginal end zone of the container attaching flap for closing the package.

2. The package as defined in claim 1 wherein the last named means consists of a weakened line in each of said cover flap, said attaching flap, said body portion and said container extending inwardly from said fold and beyond said sealed zone and transversely of said tongue, all of said weakened lines being in substantially superposed relation to each other.

3. The package as defined in claim 1 wherein said tongue is hooked around the edge of said container and has each of two portions thereof thermoplastically secured to one side of the container, one portion being disposed between the container-attaching flap and the container and the other portion being disposed between the container and body portion of the cover.

References Cited in the file of this patent

UNITED STATES PATENTS

| | | |
|---|---|---|
| 2,254,545 | Roberts | Sept. 2, 1941 |
| 2,547,779 | Renyck | Apr. 3, 1951 |
| 2,558,996 | Ullmann | July 3, 1951 |
| 2,658,613 | Volckening | Nov. 10, 1953 |